United States Patent
Maliverney et al.

(10) Patent No.: US 8,242,226 B2
(45) Date of Patent: Aug. 14, 2012

(54) ROOM-TEMPERATURE VULCANISABLE ORGANOPOLYSILOXANE COMPOUND TO GIVE AN ELASTOMER AND NOVEL ORGANOPOLYSILOXANE POLYCONDENSATION CATALYSTS

(75) Inventors: Christian Maliverney, Saint Julien sur Bibost (FR); Laurent Saint-Jalmes, Vourles (FR)

(73) Assignee: Bluestar Silicones France S.A.S., Lyon Cedex (FR)

( * ) Notice: Subject to any disclaimer, the term of this patent is extended or adjusted under 35 U.S.C. 154(b) by 70 days.

(21) Appl. No.: 12/809,549

(22) PCT Filed: Nov. 18, 2008

(86) PCT No.: PCT/FR2008/001771
§ 371 (c)(1),
(2), (4) Date: Sep. 28, 2010

(87) PCT Pub. No.: WO2009/106721
PCT Pub. Date: Sep. 3, 2009

(65) Prior Publication Data
US 2011/0009558 A1    Jan. 13, 2011

(30) Foreign Application Priority Data
Dec. 20, 2007  (FR) ...................................... 07 08921

(51) Int. Cl.
*C08G 77/04* (2006.01)
*C08G 77/06* (2006.01)
*C08G 77/08* (2006.01)

(52) U.S. Cl. ................................ 528/14; 528/19; 528/20
(58) Field of Classification Search ........................ None
See application file for complete search history.

(56) References Cited

U.S. PATENT DOCUMENTS

| 2,114,012 A | 4/1938 | Andersen et al. |
| 2,843,555 A * | 7/1958 | Berridge ......................... 528/39 |
| 3,719,634 A | 3/1973 | Clark et al. |

FOREIGN PATENT DOCUMENTS

WO    2006/041445    4/2006

OTHER PUBLICATIONS

Holland et al. "Synthesis of Highly Ordered, Three-Dimensional, Macroporous Structures of Amorphous or Crystalline Inorganic Oxides, Phosphates, and Hybrid Composites" Chem. Mater. 1999, 11, 795-805.*
International Search Report based on PCT/FR2008/001771 dated Oct. 8, 2009 (8 pgs.).

\* cited by examiner

*Primary Examiner* — Robert S Loewe
(74) *Attorney, Agent, or Firm* — Baker Donelson Bearman Caldwell & Berkowitz, PC

(57) ABSTRACT

The present invention relates to an organopolysiloxane composition that can be vulcanized at room temperature into an elastomer that is crosslinked by polycondensation and that does not contain alkyltin-based catalysts and also to novel organopolysiloxane polycondensation catalysts.

20 Claims, No Drawings

ROOM-TEMPERATURE VULCANISABLE ORGANOPOLYSILOXANE COMPOUND TO GIVE AN ELASTOMER AND NOVEL ORGANOPOLYSILOXANE POLYCONDENSATION CATALYSTS

CROSS REFERENCE TO RELATED APPLICATIONS

This application is a §371 National Stage Application of PCT/FR2008/001771 filed Dec. 18, 2008, which claims priority to French Application 07 08921 filed Dec. 20, 2007.

BACKGROUND OF THE INVENTION

1. Field of the Invention

The present invention relates to an organopolysiloxane composition that can be vulcanized at room temperature into an elastomer that is crosslinked by polycondensation and that does not contain alkyltin-based catalysts which exhibit toxicity problems.

The invention also relates to novel polycondensation catalysts in silicone chemistry, and to the uses thereof as catalysts for the polycondensation reaction of organopolysiloxanes.

2. Description of Related Art

Elastomer formulations that crosslink via polycondensation generally involve a silicone oil, generally a polydimethylsiloxane, with hydroxyl end groups, optionally prefunctionalized by a silane so as to have alkoxy ends, a crosslinker, a polycondensation catalyst, conventionally a tin salt or an alkyl titanate, a reinforcing filler and other optional additives such as bulking fillers, adhesion promoters, colorants, biocidal agents, etc.

These room-temperature vulcanizing organopolysiloxane compositions are well known and are classified into 2 different groups: single-component compositions (RTV-2) and two-component compositions (RTV-1).

During crosslinking, water (either provided by atmospheric moisture in the case of RTV-1 compositions, or introduced into one part of the composition in the case of RTV-2 compositions) enables the polycondensation reaction, which results in the formation of the elastomeric network.

Generally, single-component (RTV-1) compositions crosslink when they are exposed to moisture in the air, that is to say that they cannot crosslink in an enclosed medium. For example, the single-component silicone compositions used as sealants or cold-setting adhesives follow a mechanism of hydrolysis of reactive functional groups of the acetoxysilane, ketiminoxysilane, alkoxysilane, etc. type, followed by condensation reactions between the silanol groups formed and other residual reactive functional groups. The hydrolysis is generally carried out by virtue of water vapor which diffuses into the material from the surface exposed to the atmosphere. Generally, the kinetics of the polycondensation reactions is extremely slow; these reactions are therefore catalyzed by a suitable catalyst. As catalysts which are used, use is most often made of catalysts based on tin, titanium, an amine or compositions of these catalysts. Catalysts based on tin (cf. in particular FR-A-2 557 582) and on titanium in particular FR-A-2 786 497) are catalysts that are very effective.

As regards two-component compositions, they are sold and stored in the form of two components, a first component containing the base polymer materials and the second component containing the catalyst. The two components are mixed at the moment of use and the mixture crosslinks in the form of a relatively hard elastomer. These two-component compositions are well known and are described, in particular, in the book by Walter Noll "Chemistry and Technology of Silicones" 1968, 2nd Edition, on pages 395 to 398. These compositions essentially comprise 4 different ingredients:

a reactive $\alpha,\omega$-dihydroxydiorganopolysiloxane polymer,
a crosslinking agent, generally a silicate or a polysilicate,
a tin catalyst, and
water.

Usually, the condensation catalyst is based on an organic tin compound. Indeed, many tin-based catalysts have already been proposed as crosslinking catalysts for these RTV-2 compositions. The most widely used compounds are alkyltin carboxylates such as tributyltin monooleate or dialkyltin dicarboxylates such as dibutyltin dilaurate, dibutyltin diacetate or dimethyltin dilaurate (see the book by Noll "Chemistry and Technology of silicones" page 337, Academic Press, 1968—$2^{nd}$ Edition or patents EP 147 323 or EP 235 049).

However, the alkyltin-based catalysts, although very effective, usually colorless, liquid and soluble in silicone oils, have the drawback of being toxic (CMR2 toxic for reproduction).

Titanium-based catalysts, also widely used in RTV-1 compositions, have however a major drawback: they have slower kinetics than tin-based catalysts. Furthermore, these catalysts cannot be used in RTV-2 compositions due to gelling problems.

Other catalysts are sometimes mentioned, such as catalysts based on zinc, zirconium or aluminum, but they have only experienced minor industrial development due to their mediocre effectiveness.

Coatings formed from alkoxysilanes (component (A)) optionally in the presence of a metal alcoholate (component (E)), in particular cerium alcoholates, have also been described in the reference WO 2006/041445, see page 36, lines 18 to 35. Alkoxysilanes are well known for their high reactivity and their ability to crosslink, even without the presence of catalyst. It is clearly indicated on page 29, line 17 that these metal alcoholates are optionally used as catalysts for the alkoxysilane. This reference does not describe crosslinkable compositions that comprise organopolysiloxanes.

For sustainable development, it therefore appears necessary to develop nontoxic catalysts for the polycondensation reaction of organopolysiloxanes.

Another important aspect for a catalyst of the polycondensation reaction of organopolysiloxanes is the pot life, that is to say the time during which the composition can be used after mixing without curing. This time must be long enough to allow it to be used, but short enough to obtain a moulded article that can be handled at the latest a few minutes or a few hours after it has been manufactured. The catalyst must thus make it possible to obtain a good compromise between the pot life of the catalyzed mixture and the time at the end of which the molded article can be handled (these times depend on the targeted application such as, for example, the molding or manufacture of seals). In addition, the catalyst must confer, on the catalyzed mixture, a spreading time which does not vary as a function of the storage time.

SUMMARY OF THE INVENTION

The main objective of the present invention is therefore to find a catalyst that can be used both in the crosslinking of single-component and two-component elastomer compositions.

Another main objective of the present invention is to propose a catalyst system that continues to simultaneously meet the constraints of storage, of processing and of crosslinking of the two types of single-component and two-component elastomer compositions.

Another main objective of the present invention is to propose a catalyst system that continues to simultaneously meet the constraints of storage, of processing and of crosslinking of the two types of single-component and two-component elastomer compositions.

An organopolysiloxane composition has now been found, and it is this which constitutes the subject of the present invention, characterized in that the organopolysiloxane composition comprises:

a silicone base B capable of curing via polycondensation reaction into a silicone elastomer, said silicone base comprising:
- at least one polyorganosiloxane oil C capable of crosslinking via polycondensation into an elastomer;
- optionally at least one crosslinking agent D;
- optionally at least one adhesion promoter E; and
- optionally at least one siliceous, organic and/or non-siliceous mineral filler F; and a catalytically effective amount of at least one polycondensation catalyst which is a metal complex or salt A of formula (1) below:

$$[M(L^1)_{r1}(L^2)_{r2}(Y)_x] \quad (1)$$

in which:
$r1 \geq 1$, $r2 \geq 0$ and $x \geq 0$;
the symbol M represents a metal selected from the group constituted by: cerium, bismuth and molybdenum;
the symbol $L^1$ represents a ligand which is an alcoholate anion and when $r1 \geq 2$, the symbols $L^1$ are identical or different;
the symbol $L^2$ represents an anionic ligand which is different from $L^1$ and when $r2 \geq 2$, the symbols $L^2$ are identical or different; and
the symbol Y represents a neutral ligand and when $x \geq 2$, the symbols Y are identical or different.

It is understood that the definition of "metal complex or salt A of formula (1)" includes any oligomeric form or analog of said metal complex or salt A.

DETAILED DESCRIPTION OF A PREFERRED EMBODIMENT

It is to the credit of the inventors that they have found, quite surprisingly and unexpectedly, that it is advisable to use metal complexes of a selection of certain metals, at least one ligand of which is an alcoholate anion, in order to obtain excellent catalyst for the polycondensation reaction of organopolysiloxanes.

It is also to the credit of the inventors that they have overcome the technical prejudice that hitherto decreed that certain complexes of metals having an alcoholate ligand have only a mediocre activity in the polycondensation reaction of organopolysiloxanes, or even no crosslinking action (FR-1 423 477, page 2).

The definition of the ligands is taken from the book "Chimie Organométallique" [Organometallic Chemistry] by Didier Astruc, published in 2000 by EDP Sciences, cf., in particular, Chapter 1, "Les complexes monométalliques" [Single metal complexes], pages 31 et seq.

The nature of the neutral ligand Y is not very important and a person skilled in the art will use any type of neutral ligand suitable for the metal in question.

The catalyst according to the invention may be in the solid or liquid state. It may be incorporated alone or in a suitable solvent. When it is in solvent, a silicone oil may be added, the solvent is then evaporated so as to transfer the catalyst into a silicone medium. The mixture obtain acts as a catalyzing base.

According to one preferred embodiment, the polycondensation catalyst according to the invention is a metal complex or salt A of formula (1') below:

$$[M(L^1)_{r1}(L^2)_{r2}] \quad (1')$$

in which:
$r1 \geq 1$ and $r2 \geq 0$;
the symbol M represents a metal selected from the group constituted by: cerium, bismuth and molybdenum;
the symbol $L^1$ represents a ligand which is an alcoholate anion and when $r1 \geq 2$, the symbols $L^1$ are identical or different; and
the symbol $L^2$ represents an anionic ligand which is different from $L^1$ and when $r2 \geq 2$, the symbols $L^2$ are identical or different.

According to another preferred embodiment, the polycondensation catalyst according to the invention is a metal complex or salt A chosen from the group constituted by the complexes of formulae (2) to (4) below:

$$[Ce(L^1)_{r3}(L^2)_{r4}]; \text{where } r3 \geq 1 \text{ and } r4 \geq 0 \text{ and } r3+r4=3; \quad (2)$$

$$[Mo(L^1)_{r5}(L^2)_{r6}]; \text{where } r5 \geq 1 \text{ and } r6 \geq 0 \text{ and } r5+r6=6; \quad (3)$$

$$[Bi(L^1)_{r7}(L^2)_{r8}]; \text{where } r7 \geq 1 \text{ and } r8 \geq 0 \text{ and } r7+r8=3; \quad (4)$$

in which:
the symbol $L^1$ represents a ligand which is an alcoholate anion and when the number of ligands $L^1 \geq 2$, the symbols $L^1$ possibly being identical or different; and
the symbol $L^2$ represents an anionic ligand which is different from $L^1$ and when the number of ligands $L^2 \geq 2$, the symbols $L^2$ possibly being identical or different.

For carrying out the invention use is preferably made, as polycondensation catalyst according to the invention, of a metal complex or salt A chosen from the group constituted by the complexes (5) to (14) below:

$$[Ce(OiPr)_4] \text{ where (OiPr)} = \text{the isopropylate anion;} \quad (5)$$

$$[Mo(O_2)(2,3\text{-butanediolate})_2]; \quad (7)$$

$$[Mo(O_2)(\text{ethylene glycolate})_2]; \quad (8)$$

$$[Mo(O_2)(1,2\text{-propanediolate})_2]; \quad (9)$$

$$[Mo(O_2)(\text{pinanediolate})_2]; \quad (10)$$

$$[Mo(O_2)(1,3\text{-propanediolate})]; \quad (11)$$

$$[Mo(O_2)(\text{meso-2,3-butanediolate})_2]; \quad (12)$$

$$[Mo(O_2)(1,2\text{-octanediolate})_2]; \text{and} \quad (13)$$

$$[Bi(\text{monoallyl ethylene glycolate})_3]. \quad (14)$$

It should be noted that at least one part of the inventive nature of the invention is due to the judicious and advantageous selection of the defined associations of metal complexes or salts A used as polycondensation catalyst.

According to one preferred embodiment of the invention, the symbol $L^1$ represents a ligand which is an alcoholate anion chosen from the group constituted by the alcoholate anions derived from the following alcohols: methanol, ethanol, propanol, isopropanol, n-butanol, cyclopentanol, cycloheptanol, cyclohexanol, s-butanol, t-butanol, pentanol, hexanol, octanol, decanol, isopropyl alcohol, allyl alcohol, diols such as, for example, ethylene glycol, 1,2-propanediol, pinanediol, 1,3-propanediol and 1,2-octanediol, 1,2-cyclohexanediol and 2,3-butanediol.

In order to explain in a little more detail the nature of the constituent elements of the metal complex A according to the invention, it is important to specify that $L^2$ is an anionic ligand which may be selected from the group constituted by the following anions: fluoro ($F^-$), chloro ($Cl^-$), triiodo ($1^-$) ($I_3$)$^-$, difluorochlorato ($1^-$) [$ClF_2$]$^-$, hexafluoroiodato ($1^-$) [$IF_6$]$^-$, oxochlorato ($1^-$) ($ClO$)$^-$, dioxochlorato ($1^-$) ($ClO_2$)$^-$, trioxochlorato ($1^-$) ($ClO_3$)$^-$, tetraoxochlorato ($1^-$) ($ClO_4$)$^-$, hydroxo ($OH$)$^-$, mercapto ($SH$)$^-$, selanido ($SeH$)$^-$, hyperoxo ($O_2$)$^-$, ozonido ($O_3$)$^-$, hydroxo ($OH^-$), hydrodisulfido ($HS_2$)$^-$, methoxo ($CH_3O$)$^-$, ethoxo ($C_2H_5O$)$^-$, propoxido ($C_3H_7O$)$^-$, methylthio ($CH_3S$)$^-$, ethanethiolato ($C_2H_5S$)$^-$, 2-chloroethanolato ($C_2H_4ClO$)$^-$, phenoxido ($C_6H_5O$)$^-$, phenylthio ($C_6H_5S$)$^-$, 4-nitrophenolato [$C_6H_4(NO_2)O$]$^-$, formato ($HCO_2$)$^-$, acetato ($CH_3CO_2$)$^-$, propionato ($CH_3CH_2CO_2$)$^-$, nitrido ($N_3$)$^-$, cyano ($CN$)$^-$, cyanato ($NCO$)$^-$, thiocyanato ($NCS$)$^-$, selenocyanato ($NCSe$)$^-$, amido ($NH_2$)$^-$, phosphino ($PH_2$)$^-$, chloroazanido ($ClHN$)$^-$, dichloroazanido ($Cl_2N$)$^-$, [methanaminato ($1^-$)] ($CH_3NH$)$^-$, diazenido ($HN=N$)$^-$, diazanido ($H_2N-NH$)$^-$, diphosphenido ($HP=P$)$^-$, phosphonito ($H_2PO$)$^-$, phosphinato ($H_2PO_2$)$^-$, carboxylato, enolato, amides, alkylato and arylato.

According to one particularly preferred embodiment, $L^2$ is an anionic ligand selected from the group constituted by the following anions: acetate, propionate, butyrate, isobutyrate, diethylacetate, benzoate, 2-ethylhexanoate, stearate, methoxide, ethoxide, isopropoxide, tert-butoxide, tert-pentoxide, 8-hydroxyquinolinate, naphthenate, tropolonate and the oxido $O^{2-}$ anion.

The nature of the neutral ligand Y is not very important and a person skilled in the art will use any type of neutral ligand suitable for the metal in question.

Another subject of the invention consists of the use, as a catalyst for the polycondensation reaction of organopolysiloxanes, of metal complexes or salts A according to the invention as described above.

Another subject of the invention consists of the use, as a catalyst for the polycondensation reaction, of the compounds chosen from the group constituted by the complexes of formulae (5) to (14):

[Ce(OiPr)$_4$]where(OiPr)=the isopropylate anion;  (5)

[Mo(O$_2$)(2,3-butanediolate)$_2$];  (7)

[Mo(O$_2$)(ethylene glycolate)$_2$];  (8)

[Mo(O$_2$)(1,2-propanediolate)$_2$];  (9)

[Mo(OH)(pinanediolate)$_2$];  (10)

[Mo(O$_2$)(1,3-propanediolate)$_2$];  (11)

[Mo(O$_2$)(meso-2,3-butanediolate)$_2$];  (12)

[Mo(O$_2$)(1,2-octanediolate)$_2$]; and  (13)

[Bi(monoallyl ethylene glycolate)$_3$].  (14)

According to another of its aspects, one subject of the present invention is also the novel compounds of the following formulae:

[Mo(O$_2$)(pinanediolate)$_2$]; and  (10)

[Bi(monoallyl ethylene glycolate)$_3$].  (14)

The amount of polycondensation catalyst according to the invention (metal complex or salt A) is between 0.1 and 10% by weight of the total weight, preferably between 0.5 and 5%, whether it is a single-component or two-component preparation.

Description of the Silicone Base B:

The silicone bases used in the present invention that crosslink and cure via polycondensation reactions are well known. These bases are described in detail in particular in numerous patents and they are commercially available.

These silicone bases may be single-component bases, that is to say bases that are packaged in a single package, and stable during storage, in the absence of moisture, which can be cured in the presence of moisture, in particular moisture provided by the ambient air or by water generated within the base during the use thereof.

Apart from single-component bases, use may be made of two-component bases, that is to say bases that are packaged in two packages, which cure as soon as the catalyst according to the invention is incorporated. They are packaged, after incorporation of the catalyst, in two separate fractions, one of the fractions possibly containing, for example, only the catalyst according to the invention or a mixture with the crosslinking agent.

The silicone base B used to produce the composition according to the invention may comprise:

at least one polyorganosiloxane oil C capable of crosslinking via polycondensation into an elastomer;

optionally at least one crosslinking agent D;

optionally at least one adhesion promoter E; and optionally at least one siliceous, organic and/or non-siliceous mineral filler F.

The polyorganosiloxane oil C is preferably an α,ω-dihydroxypolydiorganosiloxane polymer, with a viscosity between 50 and 5 000 000 mPa·s at 25° C. and the crosslinking agent D is preferably an organosilicon compound bearing more than two hydrolyzable groups bonded to the silicon atoms per molecule. The polyorganosiloxane oil C may also be functionalized at its ends by hydrolyzable radicals obtained by condensation of a precursor bearing hydroxyl functional groups with a crosslinking silane bearing hydrolyzable radicals.

As the crosslinking agent (D), mention may be made of:

silanes of the following general formula:

$$R^1_k Si(OR^2)_{(4-k)}$$

in which the symbols $R^2$, which are identical or different, represent alkyl radicals having from 1 to 8 carbon atoms, such as methyl, ethyl, propyl, butyl, pentyl or 2-ethylhexyl radicals, $C_3$-$C_6$ oxyalkylene radicals, the symbol $R^1$ represents a linear or branched, saturated or unsaturated, aliphatic hydrocarbon-based group, a saturated or unsaturated and/or aromatic, monocyclic or polycyclic carbocyclic group, and k is equal to 0, 1 or 2; and the partial hydrolysis products of this silane.

As examples of $C_3$-$C_6$ alkoxyalkylene radicals, mention may be made of the following radicals:

$CH_3OCH_2CH_2$—

$CH_3OCH_2CH(CH_3)$—

$CH_3OCH(CH_3)CH_2$—

$C_2H_5OCH_2CH_2CH_2$—

The symbol $R^1$ represents a $C_1$-$C_{10}$ hydrocarbon-based radical that encompasses:
- $C_1$-$C_{10}$ alkyl radicals such as methyl, ethyl, propyl, butyl, pentyl, 2-ethylhexyl, octyl or decyl radicals;
- vinyl and allyl radicals; and
- $C_5$-$C_8$ cycloalkyl radicals such as phenyl, tolyl and xylyl radicals.

The crosslinking agents D are products that are available on the silicones market; furthermore, their use in room-temperature curing compositions is known; it occurs in particular in French patents FR-A-1 126 411, FR-A-1 179 969, FR-A-1 189 216, FR-A-1 198 749, FR-A-1 248 826, FR-A-1 314 649, FR-A-1 423 477, FR-A-1 432 799 and FR-A-2 067 636.

Preference is more particularly given, among the crosslinking agents D, to alkyltrialkoxysilanes, alkyl silicates and alkyl polysilicates, in which the organic radicals are alkyl radicals having from 1 to 4 carbon atoms.

As other examples of crosslinking agents D that may be used, mention is more particularly made of the following silanes:
- propyltrimethoxysilane;
- methyltrimethoxysilane;
- ethyltrimethoxysilane;
- vinyltriethoxysilane;
- methyltriethoxysilane;
- vinyltriethoxysilane;
- propyltriethoxysilane;
- tetraethoxysilane;
- tetrapropoxysilane;
- 1,2-bis(trimethoxysilyl)ethane;
- 1,2-bis(triethoxysilyl)ethane; and
- tetraisopropoxysilane,
- or else: $CH_3Si(OCH_3)_3$; $C_2H_5Si(OC_2H_5)_3$; $C_2H_5Si(OCH_3)_3CH_2$=$CHSi(OCH_3)_3$; $CH_2$=$CHSi(OCH_2CH_2OCH_3)_3C_6H_5Si(OCH_3)_3$; $[CH_3][OCH(CH_3)CH_2OCH_3]Si[OCH_3]_2Si(OCH_3)_4$; $Si(OC_2H_5)_4$; $Si(OCH_2CH_2CH_3)_4$; $Si(OCH_2CH_2CH_2CH_3)_4Si(OC_2H_4OCH_3)_4$; $CH_3Si(OC_2H_4OCH_3)_3$; $ClCH_2Si(OC_2H_5)_3$.

As other examples of crosslinking agent D, men on may be made of ethyl polysilicate or n-propyl polysilicate.

Use is generally made of 0.1 to 60 parts by weight of crosslinking agent D per 100 parts by weight of polyorganosiloxane C capable of crosslinking via polycondensation to an elastomer.

Thus the composition according to the invention may comprise at least one adhesion promoter E such as, for example, the organosilicon compounds bearing both:
(1) one or more hydrolyzable groups bonded to the silicon atom, and
(2) one or more organic groups substituted with radicals comprising a nitrogen atom or chosen from the group of (meth)acrylate, epoxy and alkenyl radicals, and more preferably still from the group constituted by the following compounds, taken alone or as a mixture:
- vinyltrimethoxysilane (VTMO);
- 3-glycidoxypropyltrimethoxysilane (GLYMO);
- methacryloxypropyltrimethoxysilane (MEMO);
- $[H_2N(CH_2)_3]Si(OCH_2CH_2CH_3)_3$;
- $[H_2N(CH_2)_3]Si(OCH_3)_3$;
- $[H_2N(CH_2)_3]Si(OC_2H_5)_3$;
- $[H_2N(CH_2)_4]Si(OCH_3)_3$;
- $[H_2NCH_2CH(CH_3)CH_2CH_2]SiCH_3(OCH_3)_2$;
- $[H_2NCH_2]Si(OCH_3)_3$;
- $[n-C_4H_9\text{—}HN\text{—}CH_2]Si(OCH_3)_3$;
- $[H_2N(CH_2)_2NH(CH_2)_3]Si(OCH_3)_3$;
- $[H_2N(CH_2)_2NH(CH_2)_3]Si(OCH_2CH_2OCH_3)_3$;
- $[CH_3NH(CH_2)_2NH(CH_2)_3]Si(OCH_3)_3$;
- $[H(NHCH_2CH_2)_2NH(CH_2)_3]Si(OCH_3)_3$;

$$H_2(CH_2)NH(CH_2)_3Si(OCH_3)_2$$
$$|$$
$$OCH(CH_2)CHOCH_3$$
$$H_2(CH_2)NH(CH_2)_3Si\text{—}CH\text{=}CH_2$$
$$|$$
$$(OCH_3)_2$$

or polyorganosiloxane oligomers containing such organic groups at a content greater than 20%.

For the single-component and two-component bases, use is made, as the mineral fillers F, of very finely divided products, the average particle diameter of which is less than 0.1 μm. These fillers include fumed silicas and precipitated silicas; their BET specific surface area is generally greater than 40 m²/g. These fillers may also be in the form of more coarsely divided products, having an average particle diameter greater than 0.1 μm. As examples of such tillers, mention may be made of ground quartz, diatomaceous silicas, calcium carbonate, calcined clay, rutile-type titanium oxide, iron, zinc, chromium, zirconium or magnesium oxides, the various forms of alumina (hydrated or unhydrated), boron nitride, lithopone, barium metaborate, barium sulfate and glass microbeads; their specific surface area is generally less than 30 m²/g.

These fillers may have been surface-modified by treatment with the various organosilicon compounds customarily employed for this purpose. Thus, these organosilicon compounds may be organochlorosilanes, diorganocyclopolysiloxanes, hexaorganodisiloxanes, hexaorganodisilazanes or diorganocyclopolysilazanes (French patents FR-A-1 126 884, FR-A-1 136 885 and FR-A-1 236 505, and British patent GB-A-1 024 234). The treated fillers contain, in most cases, from 3 to 30% of their weight of organosilicon compounds. The fillers may be constituted of a mixture of several types of fillers of different particle size; thus, for example, they may be constituted of 30 to 70% of finely divided silicas with a BET specific surface area greater than 40 m²/g and of 70 to 30% of more coarsely divided silicas with a specific surface area less than 30 m²/g.

The purpose of introducing fillers is to give good mechanical and rheological properties to the elastomers that result from the curing of the compositions according to the invention.

In combination with these fillers, use may be made of mineral and/or organic pigments and also agents that improve the thermal resistance (salts and oxides of rare-earth elements such as ceric oxides and hydroxides) and/or the fire resistance of the elastomers. For example, it is possible to use the cocktails of oxides described in international application WO 98/29488. Mention may be made, among the agents for improving the fire resistance, of halogenated organic derivatives, organic phosphorus derivatives, platinum derivatives, such as chloroplatinic acid (its reaction products with alkanols or ethers), or platinous chloride-olefin complexes. These pigments and agents together represent at most 20% of the weight of the fillers.

Other customary auxiliary agents and additives may be incorporated into the composition according to the invention, these are chosen as a function of the applications in which said compositions are used.

The silicone base used to produce the composition according to the invention may comprise:
- 100 parts of polyorganosiloxane oil C capable of crosslinking via polycondensation into an elastomer;
- 0 to 20 parts of a crosslinking agent D;
- 0 to 20 parts of an adhesion promoter E; and
- 0 to 50 parts of filler F.

In addition to the main constituents, nonreactive linear polyorganosiloxane polymers G may be introduced with the intention of acting on the physical characteristics of the compositions in accordance with the invention and/or on the mechanical properties of the elastomers resulting from the curing of these compositions.

These nonreactive linear polyorganosiloxane polymers G are well known; they comprise more especially: $\alpha,\omega$-bis(triorganosiloxy)diorganopolysiloxane polymers with viscosities of at least 10 mPa·s at 25° C. formed essentially of diorganosiloxy units and of at least 1% of monoorganosiloxy and/or siloxy units, the organic radicals bonded to the silicon atoms being chosen from the methyl, vinyl and phenyl radicals, 60% at least of these organic radicals being methyl radicals and 10% at most being vinyl radicals. The viscosity of these polymers can reach several tens of millions of mPa·s at 25° C.; they therefore include oils with a fluid to viscous appearance and soft to hard gums. They are prepared according to the usual techniques described more specifically in French patents FR-A-978 058, FR-A-1 025 150, FR-A-1 108 764 and FR-A-1 370 884. Use is preferably made of $\alpha,\omega$-bis(trimethylsiloxy)dimethylpolysiloxane oils with a viscosity ranging from 10 mPa·s to 1000 mPa·s at 25° C. These polymers, which act as plasticizers, can be introduced in a proportion of at most 70 parts, preferably of 5 to 20 parts, per 100 parts of the polyorganosiloxane oil C capable of crosslinking via polycondensation.

The compositions according to the invention can in addition advantageously comprise at least one silicone resin H. These silicone resins are branched organopolysiloxane polymers which are well known and which are available commercially. They have, per molecule, at least two different units chosen from those of formula $R'''_3SiO_{1/2}$ (M unit), $R'''_2SiO_{2/2}$ (D unit), $R'''SiO_{3/2}$ (T unit) and $SiO_{4/2}$ (Q unit). The $R'''$ radicals are identical or different and are chosen from linear or branched alkyl radicals or vinyl, phenyl or 3,3,3-trifluoropropyl radicals. Preferably, the alkyl radicals have from 1 to 6 carbon atoms inclusive. More particularly, mention may be made, as alkyl R radicals, of methyl, ethyl, isopropyl, tert-butyl and n-hexyl radicals. These resins are preferably hydroxylated and have, in this case, a weight content of hydroxyl groups of between 5 and 500 meq/100 g.

Mention may be made, as examples of resins, of MQ resins, MDQ resins, TD resins and MDT resins.

In order to manufacture the compositions according to the invention it is necessary, in the case of the single-component compositions, to use equipment that makes it possible to intimately mix the various fundamental constituents in a moisture-free environment, with or without a supply of heat, optionally added to which constituents are the aforementioned adjuvants and additives. All these ingredients may be loaded into the equipment in any order of introduction. Thus, it is possible to firstly mix the organopolysiloxane oils C and the fillers F and then to add to the paste obtained the crosslinkers D, the compounds E and the catalyst according to the invention. It is also possible to mix the oils C, the crosslinkers D, the compounds E and the fillers F and to subsequently add the catalyst according to the invention. During these operations, the mixtures may be heated at a temperature within the range of 50-180° C. under atmospheric pressure or under a reduced pressure in order to promote the removal of volatile materials.

The single-component compositions according to the invention, used as they are, that is to say undiluted, or in the form of dispersions in diluents, are stable during storage in the absence of water and cure at low temperatures (after removal of solvents in the case of dispersions) in the presence of water to form elastomers.

After the deposition of the compositions as they are, onto solid substrates, in a humid atmosphere, it is observed that a process of curing into elastomers occurs, it takes place from the outside to the inside of the mass deposited. A skin forms first at the surface, then the crosslinking continues in depth. The complete formation of the skin, which results in a tack-free feel of the surface, requires a period of time of a few minutes; this period of time depends on the degree of relative humidity of the atmosphere surrounding the compositions and on the crosslinkability of the latter.

Furthermore, the in-depth curing of the deposited layers, which must be sufficient to allow the demolding and handling of the elastomers formed, requires a longer period of time. Indeed, this period of time depends not only on the factors mentioned above for the formation of the tack-free feel but also on the thickness of the deposited layers, which thickness generally lies between 0.5 mm and several centimeters. The single-component compositions may be used for multiple applications such as jointing in the construction industry, assembling the most diverse materials (metals, plastics, natural and synthetic rubbers, wood, board, earthenware, brick, ceramic, glass, stone, concrete, masonry units), insulating electrical conductors, the potting of electronic circuits, or the preparation of molds used for manufacturing articles made of synthetic resins or foams.

The manufacture of the two-component compositions according to the invention is also carried out by mixing various constituents in suitable equipment. In order to obtain homogeneous compositions, it is preferable to firstly mix the polymers A with the fillers C; the whole mixture may be heated for at least 30 minutes at a temperature above 80° C., so as to complete the wetting of the fillers by the oils. To the mixture obtained, preferably brought to a temperature below 80° C., for example of around room temperature, may be added the other constituents, that is to say the crosslinking agents, the catalyst and optionally various additives and adjuvants and even water.

The compositions in accordance with the invention may be employed for multiple applications, such as jointing and/or bonding in the construction industry or the transportation industry (e.g.: automobile, aerospace, railroad, maritime and aeronautical industries), assembling the most diverse materials (metals, plastics, natural and synthetic rubbers, wood, boards, polycarbonate, earthenware, brick, ceramic, glass, stone, concrete and masonry units), insulating electrical conductors, the potting of electronic circuits, and the preparation of molds used for manufacturing articles made of synthetic resins or foams.

Thus, another subject of the invention consists of a two-component system that is a precursor of the organopolysiloxane composition according to the invention and as defined above and that can be vulcanized to a silicone elastomer via polycondensation reactions and characterized in that it is in two separate parts P1 and P2 intended to be mixed in order to form said composition, and in that one of these parts comprises the metal complex or salt A according to the invention and as defined above as a catalyst for the polycondensation reaction of organopolysiloxanes and the crosslinking agent D, whilst the other part is free of the aforementioned species and comprises:
- per 100 parts by weight of the polyorganosiloxane oil(s) C capable of crosslinking via polycondensation into an elastomer;
- from 0.001 to 10 part(s) by weight of water.

Another subject of the invention also consists of a single-component polyorganosiloxane composition that is stable during storage in the absence of moisture and that crosslinks, in the presence of water, into an elastomer, characterized in that it comprises:
- at least one crosslinkable linear polyorganopolysiloxane that has functionalized ends of alkoxy, oxime, acyl and/or enoxy type, preferably alkoxy type;
- a filler; and
- a catalyst of the polycondensation reaction which is the metal complex A according to the invention and as defined above.

Single-component bases are described in detail, for example, in patents EP 141 685, EP 147 323, EP 102 268, EP 21 859, FR 2 121 289 and FR 2 121 631, cited as reference.

It possible to add, to these single-component bases, adhesion promoters E chosen, for example, from organosilicon compounds simultaneously bearing, on the one hand, organic groups substituted by radicals chosen from the group of amino, ureido, isocyanate, epoxy, alkenyl, isocyanurate, hydantoyl, guanidino and mercaptoester radicals and, on the other hand, hydrolyzable groups, in general alkoxy groups bonded to the silicon atoms. Examples of such adhesion agents are described in U.S. Pat. Nos. 3,517,001, 4,115,356, 4,180,642, 4,273,698, 4,356,116 and in European patents EP 31 996 and EP 74 001.

Two-component bases are described in detail, for example, in patents EP 118 325, EP 117 772, EP 10 478, EP 50 358, EP 184 966, U.S. Pat. Nos. 3,801,572 and 3,888,815 cited as reference.

Another subject of the invention consists of the use of a metal complex or salt A according to the invention and as defined above as a catalyst for the polycondensation reaction of organopolysiloxanes.

The final subject of the invention consists of an elastomer obtained by crosslinking and curing of the two-component system according to the invention and as described above, or of the composition according to the invention and as described above.

Other advantages and features of the present invention will appear on reading the following examples that are given by way of illustration and that are in no way limiting.

EXAMPLES

Example 1

Catalyst Synthesis

Synthesis of Catalyst (10): [Mo(O$_2$)(pinanediolate)$_2$]

Added to a suspension of 4 mmol of molybdenyl acetylacetonate (1.2 g) in 20 ml of cyclohexane were 16 mmol of pinanediol (2.72 g), then the mixture was heated at reflux. After 1 h 30 min, the medium turned a clear orange color, then formed a bright yellow solid. After 3 h 30 min, the mixture was concentrated and the solid obtained was recrystallized in cyclohexane to give 1.5 g of bright yellow solid of molybdenyl pinanediolate in the form of its dehydrated dimer [MoOH(pinanediolate)$_2$]$_2$O based on the characteristic IR bands at 751 nm (according to Sheldon. Recl. Tray. Chim. Pays Bas, 92, 253 (1973)).

Mo calc. 20.97%. found (ICP) 16.0% (the product contains pinanediol).

Synthesis of Catalyst (14): [Bi(monoallyl ethylene glycolate)$_3$]

Added over 15 min to a suspension of 48 mmol of sodium hydride (2 g at 60% previously washed with pentane) in 50 ml of anhydrous THF were 48 mmol of ethylene glycol monoallyl ether (5.31 g). The solution obtained was added over 10 min to a solution of 16 mmol of bismuth trichloride (5.04 g) in 100 ml of the same solvent. After stirring for 4 h at room temperature, the homogeneous brown solution was evaporated to dryness. The brown solid was taken up with hexane, and the mixture filtered over celite. After evaporation of the solvent, a brown liquid was obtained (5.2 g).

Bi calc. 40.78%. found (ICP) 32.5% (the product isolated contains ethylene glycol monoallyl ether).

IR: 2844, 1347, 1066, 993, 918.

Example 2

Initial Test

In order to demonstrate the catalytic activity of novel molecules, two simple tests were developed:

In the 2 tests, the procedure below was followed:

The functionalized or unfunctionalized oil, then the catalyst, then the crosslinker in the case of the RTV2 composition, then optionally the water were placed successively in a small open cylindrical container equipped with a magnetic stirrer bar, and the stirring was set at 300 rpm. The following were measured: the time when the stirring stops which corresponds to a viscosity of 1000 cP (or mPa) approximately, then the time for the oil to no longer flow, the tack-free skin-over time and the core crosslinking time. The activity of novel catalysts was compared to that of tetrabutyldistannoxane dilaurate or Tegokat 225, one of the fastest dialkyltin type catalysts (1.24 mmol in Sn equivalents).

RTV2 Test:

The species to be tested was brought into contact with a short α,ω-dihydroxylated polydimethylsiloxane oil (½ equivalent relative to the OH content, viscosity of 100 mPa·s. 48V100 oil) then a crosslinker, ethyl silicate was added (1 equivalent/OH), or the same volume of "advanced" ethyl silicate, that is to say a mixture of ethoxypolysiloxanes (in this case >1 eq/OH).

The amounts used in the examples below, unless mentioned, were the following:
- 4.48 g of 48V100 oil having 0.553 mmol OH/g (viscosity: 100 cP or mPa);
- 1.24 mmol of species to be tested (½ eq./OH);
- 0.52 g of ethyl silicate (1 eq./OH) in the presence or absence of 90 μl of water (2 eq./OH), or the same volume of "advanced" silicate as the ethyl silicate (=0.82 g).

RTV1 Test:

The same oil used before was previously functionalized with vinyltrimethoxysilane (VTMO); the species to be tested was brought into contact with this oil under the same conditions as before, then 2 equivalents of water were added (2 eq./initial OH).

The amounts used in the examples below, unless mentioned, were the following:
- 4.77 g of VTMO-functionalized 48V100 oil;
- 1.24 mmol of species to be tested (½ eq./OH);
- 90 μl of water (added after 1 min of stirring=t$_0$).

The results of the RTV1 test are given in table I below:

TABLE I

RTV1 tests

| Test No. | Metal | Catalyst | Time when stirring stops (h:min) | Time to end of flowability (h:min) | Tack-free time (h:min) | Crosslinking time (h:min) | Hard/soft after 24 h |
|---|---|---|---|---|---|---|---|
| Comparative example | Sn | Tegokat225 | 00:19 | 00:22 | 00:25 | 00:34 | hard |
| 1 | Bi | Bi(ethylene glycolate monoallyl ether)$_3$ | 00:42 | 00:42 | 00:50 | 01:00 | hard |
| 2 | Ce | Ce(OiPr)4 | 00:12 | 01:40 | 00:40 | 02:30 | hard |
| 3 | Mo | MoO$_2$(ethylene glycolate)$_2$ | between 8 and 24 h | between 8 and 24 h | between 8 and 24 h | between 8 and 24 h | hard |
| 4 | Mo | MoO$_2$(1,2-propanediolate)$_2$ | <05:00 | <05:00 | <05:00 | 5:07 | hard |
| 5 | Mo | MoO$_2$(1,2-octanediolate)$_2$ | 2:30 | 3:00 | 3:00 | 3 h 30 | hard |
| 6 | Mo | MoO$_2$(2,3-butanediolate)$_2$ | 03:00 | 3:00 | 3:30 | 03:40 | hard |

The results of the RTV2 test (ethyl silicate crosslinker) are given in table II below:

TABLE II

Ethyl silicate RTV2 tests

| Test No. | Metal | Catalyst | Time when stirring stops (h:min) | Time to end of flowability (h:min) | Tack-free time (h:min) | Crosslinking time (h:min) | Hard/soft after 24 h |
|---|---|---|---|---|---|---|---|
| Comparative example | Sn | Tegokat225 | 00:20 | 00:30 | 00:42 | 00:42 | hard |
| 1 | Mo | MoO$_2$(ethylene glycolate)$_2$ | 00:30 | 00:30 | 00:45 | 00:45 | hard |
| 2 | Mo | MoO$_2$(1,2-propanediolate)$_2$ | 00:48 | 02:00 | 02:00 | 02:00 | hard |
| 3 | Mo | MoO$_2$(2,3-butanediolate)$_2$ | 00:10 | 00:15 | 0:15 | 00:25 | hard |
| 4 | Mo | [MoOH(pinanediolate)$_2$]$_2$O | 04:00 | 04:25 | 04:25 | 04:25 | hard |

The results of the RTV2 test ("advanced silicate" crosslinker) are given in table III below:

TABLE III

"Advanced" ethyl silicate RTV2 tests

| Test No. | Metal | Catalyst | Time when stirring stops (h:min) | Time to end of flowability (h:min) | Tack-free time (h:min) | Crosslinking time (h:min) | Hard/soft after 24 h |
|---|---|---|---|---|---|---|---|
| Comparative example | Sn | Tegokat225 | 00:24 | 00:29 | 00:32 | 00:36 soft 00:50 hard | hard |
| 1 | Bi | Bi(ethylene glycolate monoallyl ether)$_3$ | 00:02 | 00:10 | 00:25 | 00:25 | hard |
| 2 | Mo | MoO$_2$(1,3-propanediolate) | 05:20 | 05:20 | 05:25 | 09:00 soft | soft |
| 3 | Mo | MoO$_2$(ethylene glycolate)$_2$ | 00:43 | 00:47 | 00:47 | 00:47 | hard |
| 4 | Mo | MoO$_2$(1,2-propanediolate)$_2$ | 00:43 | 00:54 | 00:54 | 00:54 | hard |
| 5 | Mo | MoO$_2$(1,2-octanediolate)$_2$ | 00:15 | 00:15 | 00:15 | 00:20 | hard |
| 6 | Mo | MoO$_2$(2,3-butanediolate)$_2$ | 0:40 | 0:50 | 00:50 | 1:00 to 1:40 | hard |
| 7 | Mo | MoO$_2$(meso-2,3-butanediolate)$_2$ | 00:25 | 00:35 | 00:35 | 01:00 soft | very hard |
| 8 | Mo | (MoOH(2,3-butanediolate)$_2$)$_2$O | 04:30 | 04:30 | 05:00 | 05:20 | very hard |
| 9 | Mo | MoO$_2$(pinacol)$_2$ | 04:30 | 04:30 | 04:30 | 04:30 | very hard |

Example 3

Paste Test for RTV1 and RTV2 Compositions

Subsequently, certain catalysts were also tested in closer systems known as "pastes".

In RTV1 compositions, the paste used was prepared as follows: added, with stirring, to a mixture of 3464 g of an α,ω-dihydroxylated oil with a viscosity of 20 000 centipoise containing 0.066% of OH, and of 120 g of vinyltrimethoxysilane were 16 g of a 2 wt % solution of lithium hydroxide in methanol, then, after 5 min, 400 g of AE55 fumed silica were added. The mixture was devolatilized under vacuum then stored in a moisture-free environment.

For each test, the catalyst tested was mixed with 50 g of this paste, then the catalytic potential was evaluated in 3 ways:

- the skin-over time (SOT), time at the end of which surface crosslinking is observed, on a 2 mm film;
- the persistence of a tacky feel at 48 h;
- the hardness (Shore A hardness) of a 6 mm thick bead under controlled conditions (23° C. and 50% relative humidity) and over increasing times (2, 3, 7 and 14 days). The high temperature stability was also evaluated by hardness measurements carried out on the bead after 7 days at room temperature followed by 7 days at 100° C.

NB: The Shore hardness was measured on a 6 mm bead. In the table of results the symbol ">" corresponds to the hardness values measured on the upper part of the bead and the symbol "<" corresponds to the hardness values measured on the lower part of the bead that is less exposed to the ambient air than the upper part.

Various catalysts according to the invention were tested.

By way of comparison, as above, the following was also tested:

a tin-based catalyst: dibutyltin dilaurate (DBTDL);

The results are given in table III below.

TABLE III

| | | | | | Shore A hardness over 6 mm | | | | | | | |
|---|---|---|---|---|---|---|---|---|---|---|---|---|
| | | SOT | Tacky | 2 d | | 3 d | 4 d | 7 d | | 14 d | 7 d RT + 7 d 100° C. | |
| Product | % by weight | stick min | feel at 48 h | > | < | >< | >< | > | < | > < | > | < |
| Comparative example DBTDL | 0.9 | 10 | no | 32 | 22 | | | 32 | 29 | | | |
| MoO$_2$(butanediolate)$_2$ at 50% in isopropanol | 1.6 | 60 | no | gel | | gel | gel | 14 | 5 | 24 20 | 33 | 21 |

In RTV2 compositions, the tests were carried out directly on a mixture of a viscous dihydroxylated oil (48V14000) and of advanced silicate crosslinker (1 g per 22.5 g of oil) to which the catalyst was added and mixed therewith. Firstly, the pot-life was measured (time at the end of which the viscosity of the mixture prevents it from being used), then, starting from another mixture, a slug with a thickness of 6 mm was cast for the measurements of hardness over time.

NB: The Shore hardness was measured on the 6 mm slug. In the table of results the symbol ">" corresponds to the hardness values measured on the upper part of the slug and the symbol "<" corresponds to the hardness values measured on the lower part of the slug that is less exposed to the ambient air than the upper part.

By way of comparison, as above, the following was also tested:

a tin-based catalyst: dimethyltin dineodecanoate (UL28).

The results are given in table IV below.

TABLE IV

| | | | | | | Shore A hardness over 6 mm | | | | | | | |
|---|---|---|---|---|---|---|---|---|---|---|---|---|---|
| | | | % by | Pot-life | | 1 d | | 4 d | | 21 d | | 35 d | |
| Catalyst | Solvent | mol eq | weight | (min) | | > | < | > | < | > | < | > | < |
| UL28 | / | 1 | 1.4 | 23 | | 24 | 19 | 25 | 25 | 23 | 23 | 22 | 22 |
| MoO$_2$(1,2-propanediolate)$_2$ | crosslinker | 1 | 0.8 | — | | 13 | 0 | 15 | 14 | 17 | 16 | 17 | 17 |
| MoO$_2$(1,2-octanediolate)$_2$ | crosslinker | 1 | 1.2 | 11 | | 8 | 0 | 10 | 8 | 11 | 12 | 13 | 14 |
| MoO$_2$(2,3-butanediolate)$_2$ | crosslinker | 1 | 0.9 | 60 | | 12 | 0 | 23 | 0 | 24 | 26 | 24 | 27 |

The invention claimed is:

1. An organopolysiloxane composition comprising:

a silicone base B capable of curing via polycondensation reaction into a silicone elastomer, said silicone base comprising:

at least one polyorganosiloxane oil C capable of crosslinking via polycondensation into an elastomer;

optionally at least one crosslinking agent D;

optionally at least one adhesion promoter E; and optionally at least one siliceous, organic and/or non-siliceous mineral filler F; and a catalytically effective amount of at least one polycondensation catalyst which is a metal complex or salt A of formula (1) below:

$$[M(L^1)_{r1}(L^2)_{r2}(Y)_x] \quad (1)$$

in which:

r1 >1, r2>0 and x>0;

the symbol M represents a metal selected from the group consisting of cerium, bismuth and molybdenum;

the symbol $L^1$ represents a ligand which is an alcoholate anion and when r1>2, the symbols $L^1$ are identical or different, wherein when M represents cerium or molybdenum, $L^1$ represents a diol;

the symbol $L^2$ represents an anionic ligand which is different from $L^1$ and when r2>2, the symbols $L^2$ are identical or different; and the symbol Y represents a neutral ligand and when x>2, the symbols Y are identical or different.

2. The organopolysiloxane composition as claimed in claim 1, wherein the polycondensation catalyst is a metal complex or salt A of formula (1') below:

$$[M(L^1)_{r1}(L^2)_{r2}] \quad (1')$$

in which:

r1>1 and r2>0;

the symbol M represents a metal selected from the group consisting of cerium, bismuth and molybdenum;

the symbol $L^1$ represents a ligand which is an alcoholate anion and when r1>2, the symbols $L^1$ are identical or different, wherein when M represents cerium or molybdenum, $L^1$ represents a diol; and the symbol L² represents an anionic ligand which is different from L¹ and when r2>2, the symbols L² are identical or different.

3. The organopolysiloxane composition as claimed in claim 1, wherein said composition comprises a silicone base B capable of curing via polycondensation reaction into a silicone elastomer and a catalytically effective amount of at least one polycondensation catalyst which is a metal complex or salt A chosen from the group by consisting of the complexes of formulae (2) to (4) below:

[Ce(L¹)$_{r3}$(L²)$_{r4}$]; where r3≥1 and r4>0 and r3+r4=3;　(2)

[Mo(L¹)$_{r5}$(L²)$_{r6}$]; where r5≥1 and r6>0 and r5+r6=6;　(3)

and

[Bi(L¹)$_{r7}$(L²)$_{r8}$]; where r7≥1 and r8>0 and r7+r8=3;　(4)

in which:
the symbol L¹ represents a ligand which is an alcoholate anion and when the number of ligands L¹>2, the symbols L¹ are identical or different, wherein when M represents cerium or molybdenum, L¹ represents a diol; and
the symbol L² represents an anionic ligand which is different from L¹ and when the number of ligands L²>2, the symbols L² are identical or different.

4. The organopolysiloxane composition as claimed in claim 1, wherein the symbol L¹ represents a ligand which is an alcoholate anion selected from the group consisting of methanol, ethanol, propanol, isopropanol, n-butanol, cyclopentanol, cycloheptanol, cyclohexanol, s-butanol, t-butanol, pentanol, hexanol, octanol, decanol, isopropyl alcohol, allyl alcohol, and diols.

5. The organopolysiloxane composition as claimed in claim 4, wherein the diol comprises ethylene glycol, 1,2-propanediol, pinanediol, 1,3-propanediol and 1,2-octanediol, 1,2-cyclohexanediol, or 2,3-butanediol.

6. The organopolysiloxane composition as claimed in claim 1, wherein said composition comprises a silicone base B capable of curing via polycondensation reaction into a silicone elastomer and a catalytically effective amount of at least one polycondensation catalyst which is a metal complex or salt A chosen from the group consisting of complexes (7) to (14) below:

[Mo(O₂)(2,3-butanediolate)₂];　(7)

[Mo(O₂)(ethylene glycolate)₂];　(8)

[Mo(O₂)(1,2-propanediolate)₂];　(9)

[Mo(OH)(pinanediolate)₂];　(10)

[Mo(O₂)(1,3-propanediolate)₂];　(11)

[Mo(O₂)(meso-2,3-butanediolate)₂];　(12)

[Mo(O₂)(1,2-octanediolate)₂];　(13)

and

[Bi(monoallyl ethylene glycolate)₃].　(14)

7. The organopolysiloxane composition as claimed claim 1, wherein L² is an anionic ligand selected from the group consisting of fluoro (F⁻), chloro (Cl⁻), triiodo (I₃)⁻, difluorochlorato [ClF₂]⁻, hexafluoroiodato [IF₆]⁻, oxochlorato (ClO)⁻, dioxochlorato (ClO₂)⁻, trioxochlorato (ClO₃)⁻, tetraoxochlorato (ClO₄)⁻, hydroxo (OH)⁻, mercapto (SH)⁻, selanido (SeH)⁻, hyperoxo (O₂)⁻, ozonido (O₃)⁻, hydroxo (OH⁻), hydrodisulfido (HS₂)⁻, methoxo (CH₃O)⁻, ethoxo (C₂H₅O)⁻, propoxido (C₃H₇O)⁻, methylthio (CH₃S)⁻, ethanethiolato (C₂H₅S)⁻, 2-chloroethanolato (C₂H₄ClO)⁻, phenoxido (C₆H₅O)⁻, phenylthio (C₆H₅S)⁻, 4-nitrophenolato [C₆H₄(NO₂)O]⁻, formato (HCO₂)⁻, acetato (CH₃CO₂)⁻, propionato (CH₃CH₂CO₂)⁻, nitrido (N₃)⁻, cyano (CN)⁻, cyanato (NCO)⁻, thiocyanato (NCS)⁻, selenocyanato (NCSe)⁻, amido (NH₂)⁻, phosphino (PH₂)⁻, chloroazanido (ClHN)⁻, dichloroazanido (Cl₂N)⁻, [methanaminato(1⁻)] (CH₃NH)⁻, diazenido (HN=N)⁻, diazanido (H₂N—NH)⁻, diphosphenido (HP=P)⁻, phosphonito (H₂PO)⁻, phosphinato (H₂PO₂)⁻, carboxylato, enolato, amides, alkylato and arylato.

8. The organopolysiloxane composition as claimed in claim 1 wherein L² is an anionic ligand selected from the group consisting of acetate, propionate, butyrate, isobutyrate, diethylacetate, benzoate, 2-ethylhexanoate, stearate, methoxide, ethoxide, isopropoxide, tert-butoxide, tent-pentoxide, 8-hydroxyquinolinate, naphthenate, tropolonate and the oxido O²⁻ anion.

9. An elastomer obtained by crosslinking and curing the composition as claimed claim 1.

10. The organopolysiloxane composition as claimed in claim 1, wherein M represents cerium.

11. The organopolysiloxane composition as claimed in claim 1, wherein M represents bismuth.

12. The organopolysiloxane composition as claimed in claim 1, wherein M represents molybdenum.

13. The organopolysiloxane composition as claimed in claim 1, wherein the metal complex or salt A is between 0.1 and 10% by weight of the total weight.

14. The organopolysiloxane composition as claimed in claim 1, wherein the silicone base B further comprises at least one nonreactive linear polyorganosiloxane polymer G and/or at least one silicone resin H.

15. A two-component system that can be vulcanized to a silicone elastomer via polycondensation reactions and is a precursor of an organopolysiloxane composition comprising:
a silicone base B capable of curing via polycondensation reaction into a silicone elastomer, said silicone base comprising:
at least one polyorganosiloxane oil C capable of crosslinking via polycondensation into an elastomer;
optionally at least one crosslinking agent D;
optionally at least one adhesion promoter E; and
optionally at least one siliceous, organic and/or non-siliceous mineral filler F; and
a catalytically effective amount of at least one polycondensation catalyst which is a metal complex or salt A of formula (1) below:

[M (L¹)$_{r1}$ (L²)$_{r2}$(Y)$_x$]　(1)

in which:
r1≥1, r2≥0 and x≥0;
the symbol M represents a metal selected from the group consisting of cerium, bismuth and molybdenum;
the symbol L¹ represents a ligand which is an alcoholate anion and when r1≥2, the symbols L¹ are identical or different, wherein when M represents cerium or molybdenum, L¹ represents a diol;
the symbol L² represents an anionic ligand which is different from L¹ and when r2 ≥2, the symbols L² are identical or different; and
the symbol Y represents a neutral ligand and when x≥2, the symbols Y are identical or different, wherein said system is in two separate parts P1 and P2 to be mixed in order to form said composition, wherein one said part comprises the metal complex or salt A as a catalyst for the polycondensation reaction of organopolysiloxanes and the crosslinking agent D, and wherein the other part is free of the catalyst and crosslinking agent D and comprises:

per 100 parts by weight of the polyorganosiloxane oil(s) C capable of crosslinking via polycondensation into an elastomer; and from 0.001 to 10 part(s) by weight of water.

16. A single-component organopolysiloxane composition that is stable during storage in the absence of moisture and that crosslinks, in the presence of water, into an elastomer, wherein said composition comprises:

at least one crosslinkable linear polyorganopolysiloxane that has functionalized ends of alkoxy, oxime, acyl and/or enoxy type;

a filler; and a catalyst of a polycondensation reaction which is a metal complex or salt A of formula (1) below:

$$[M(L^1)_{r1}(L^2)_{r2}(Y)_x] \qquad (1)$$

in which:
r1>1, r2>0 and x>0;
the symbol M represents a metal selected from the group consisting of cerium, bismuth and molybdenum;
the symbol $L^1$ represents a ligand which is an alcoholate anion and when r1≧2, the symbols $L^1$ are identical or different, wherein when M represents cerium or molybdenum, $L^1$ represents a diol;
the symbol $L^2$ represents an anionic ligand which is different from $L^1$ and when r2≧2, the symbols $L^2$ are identical or different; and
the symbol Y represents a neutral ligand and when x≧2, the symbols Y are identical or different.

17. The single-component organopolysiloxane composition of claim 16, wherein the crosslinkable linear polyorganopolysiloxane has functionalized ends of alkoxy type.

18. A catalyst for the polycondensation reaction of organopolysiloxanes comprising a metal complex or salt A of formula (1) below:

$$[M(L^1)_{r1}(L^2)_{r2}(Y)_x] \qquad (1)$$

in which:
r1≧1, r2≧0 and x≧0;
the symbol M represents a metal selected from the group consisting of cerium, bismuth and molybdenum;
the symbol $L^1$ represents a ligand which is an alcoholate anion and when r1≧2, the symbols $L^1$ are identical or different, wherein when M represents cerium or molybdenum, $L^1$ represents a diol;
the symbol $L^2$ represents an anionic ligand which is different from $L^1$ and when r2≧2, the symbols $L^2$ are identical or different; and
the symbol Y represents a neutral ligand and when x≧2, the symbols Y are identical or different.

19. A catalyst for the polycondensation reaction of organopolysiloxanes, comprising a compound of formulae (7) to (14) below:

$$[Mo(O_2)(2,3\text{-butanediolate})_2]; \qquad (7)$$

$$[Mo(O_2)(\text{ethylene glycolate})_2]; \qquad (8)$$

$$[Mo(O_2)(1,2\text{-propanediolate})_2]; \qquad (9)$$

$$[Mo(OH)(\text{pinanediolate})_2]; \qquad (10)$$

$$[Mo(O_2)(1,3\text{-propanediolate})_2]; \qquad (11)$$

$$[Mo(O_2)(\text{meso-2,3-butanediolate})_2]; \qquad (12)$$

$$[Mo(O_2)(1,2\text{-octanediolate})_2]; \qquad (13)$$

and $$[Bi(\text{monoallyl ethylene glycolate})_3]. \qquad (14)$$

20. A compound of the formulae:

$$[Mo(OH)(\text{pinanediolate})_2]; \qquad (10)$$

or $$[Bi(\text{monoallyl ethylene glycolate})_3]. \qquad (14)$$

* * * * *